United States Patent Office 3,280,472
Patented Oct. 25, 1966

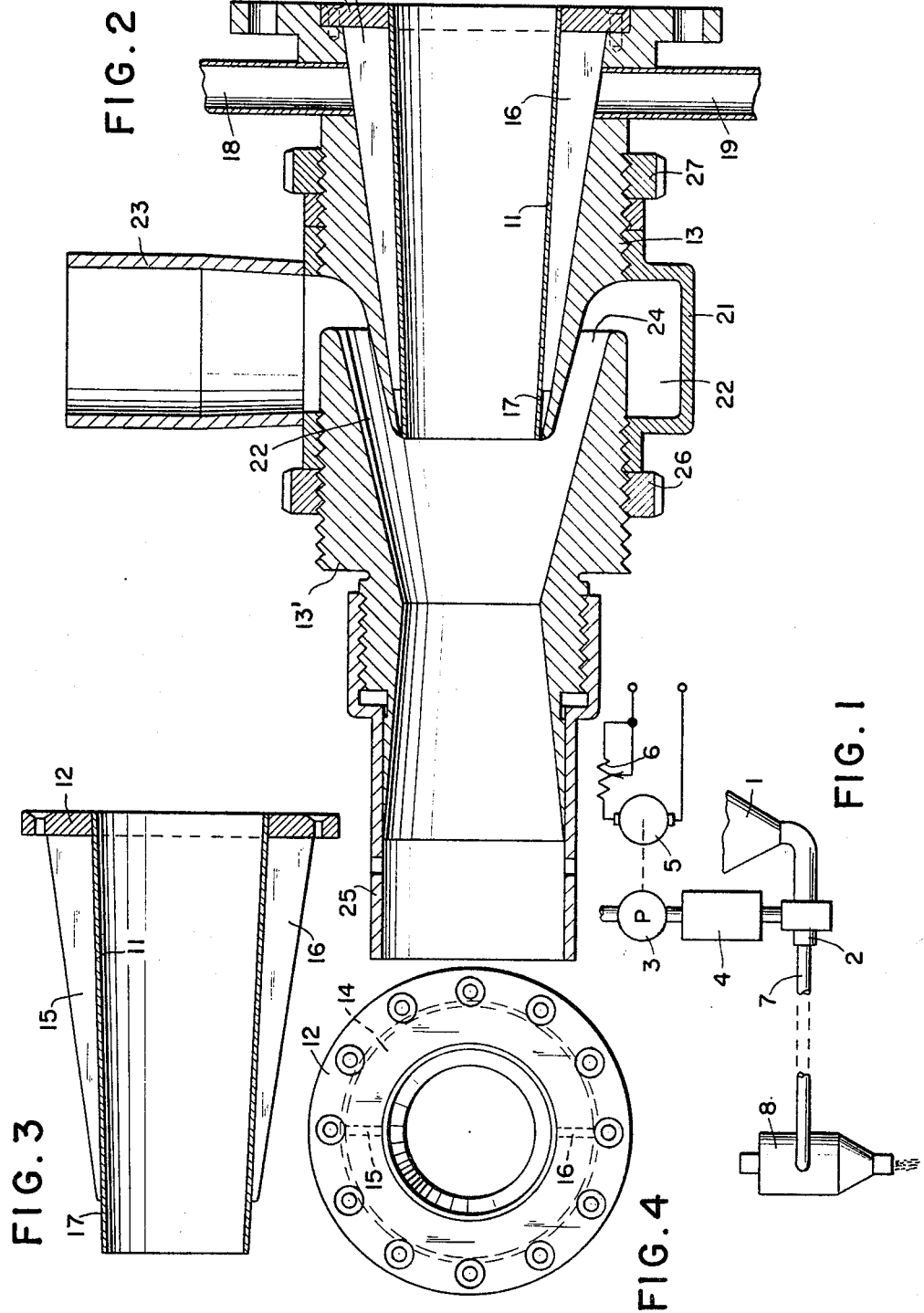

3,280,472
METHOD AND APPARATUS FOR HEAT TREATMENT OF PARTICLE MATERIALS SUCH AS SYNTHETIC PLASTICS
Zareh Lorenian, Dusseldorf, Germany
(Friedrichsplatz 16, Mannheim, Germany)
Filed Apr. 16, 1964, Ser. No. 360,209
Claims priority, application Germany, Apr. 20, 1963,
L 44,749
6 Claims. (Cl. 34—10)

My invention relates to methods and apparatus for heating or cooling pulverulent and granular solids as well as other particle materials such as finely distributed liquid or viscous substances. More particularly, my invention concerns the heat treatment of particle materials by heat exchange with a current of air.

In a preferred aspect, my invention relates to the preheating of polyvinyl chloride and other synthetic plastics immediately prior to extrusion molding or other shaping operations in a continuous fabricating sequence.

It is known to convey pulverulent material, for example pulverized coal or granular material such as grain, in closed conduits by means of an air current for passing it from one locality to another or supplying it from storage to fabricating machinery. Also known is the application of heated air for drying such materials, including the drying of granulated synthetics in a container by passing heated air therethrough.

It is an object of my invention to provide for heat treatment of air-entrainable particle material which affords imparting to the material a particularly large change in temperature as the material is being forwarded from a locality of supply to one or more localities of further fabrication.

More specifically, it is an object of the invention to afford such heating of pulverulent or granular material, for example synthetic plastics, under conditions where normally the material would have the tendency to agglomerate and thereby become unsuitable or less suitable for subsequent fabrication, but to nevertheless maintain the particles, while being heated, in mutually segregated and well flowable condition.

Conversely, in cases where the particle material, for example finely distributed liquid to be formed into ice, ice cream or sherbet, is being severely cooled during airborne transportation and would normally develop the tendency to unduly agglomerate by premature solidification, the invention aims at providing a simultaneous conveying and cooling method and apparatus that secures the desired high reduction in temperature of the material while maintaining it segregated until it arrives at the fabricating locaton.

Still another object of my invention, relating particularly to the preheating of polyvinyl chloride or other synthetic plastics to be preheated prior to extrusion or other shaping operations, is to afford bringing the particles, while they are kept segregated from each other, to a sufficiently high temperature to considerably reduce the working time thereafter required for these materials to be processed in the press or other fabricating device.

To achieve the above-mentioned objects, my invention proceeds from the observation that particles of material that are carried by a heated or cooled air current and are continuously enveloped by the flowing air, will not bake together even when the particles reach high or low temperatures at which they normally have the pronounced tendency of agglomerating, and that these particles, under air-entrained and air-enveloped conditions will likewise not appreciably precipitate upon, and adhere to, the wall surfaces of the conveying channels.

According to my invention, I employ a method according to which a particle material to be heat treated is issued from a hopper or other container through a nozzle from whose opening it is torn and forcibly entrained by an air current supplied at the temperature adapted to that of the desired heat treatment. The particles, thus enveloped and carried by the air current, are blown into a tubular channel in which they remain air-entrained and are continuously moved forward until they have reached the temperature desired for further fabrication. During this change in temperature the particle material remains segregated and pourable or capable of trickling out of the end of the channel where the material drains into a container, or is directly supplied to a fabricating device or machine, the air being separately permitted to escape. For heating particle material in the above-described manner, the entraining air current is preheated to a sufficiently high temperature before it is supplied to the nozzle. In cases where the material is to be cooled, the air current is cooled to a correspondingly low temperature before reaching the nozzle.

According to another feature of my invention, the nozzle from which the particle material issues into the air current, has a tubular portion which is peripherally surrounded near the nozzle outlet by an annular air passage communicating with the air supply at one or more localities rearwardly spaced from the nozzle outlet so that the air current is forced to travel around the nozzle end and to simultaneously move forward in the issuing direction of the particle material toward the above-mentioned tubular channel. The air current thus prevents the issuing material from contacting the channel walls and also imposes an ejector action upon the nozzle which causes forceful entrainment of the particle material.

According to another feature of my invention, the tubular nozzle portion to be thus contacted on its outside by a hot current of air, is cooled in order to prevent the material from being prematurely heated inside the nozzle structure and to become carbonized or to adhere to the nozzle wall and clog the nozzle. According to a more specific feature, the nozzle subjected to a hot current of air is provided with a jacket space which surrounds the tubular nozzle duct and, during operation, is traversed by coolant, for example water.

According to a further feature of my invention, the nozzle portion which in the above-described manner is to be contacted by a cooled air current, is heated for preventing the material from adhering to the nozzle wall and thereby clogging the nozzle outlet. The above-mentioned jacket feature is also applicable for this purpose, except that the jacket space is to be supplied with heating fluid.

The method can be modified by having the particle material forcefully entrained by means of a cold air current from the outlet opening of a first nozzle and having the resulting material-air mixture pass through a directly adjacent second nozzle from whose outlet opening the mixture is forcefully entrained by a hot air current which conveys it into and through the above-mentioned tubular channel.

For the purpose of cooling particle material, the method can be modified analogously, namely by forcefully entraining the material with the aid of hot air from the outlet of a first nozzle, passing the material-air mixture through a directly subsequent second nozzle, and having it forcefully entrained from the outlet of the second nozzle by a cold air current directed into and through the tubular channel.

The above-mentioned and further objects, advantages and features of my invention, said features being set forth with particularity in the claims annexed hereto, will be apparent from, and will be mentioned in, the following, in conjunction with embodiments of heat treating apparatus according to the invention illustrated by way of example on the accompanying drawings in which:

FIG. 1 is a schematic diagram of a complete heat treating apparatus.

FIG. 2 shows in section the nozzle portion of the apparatus.

FIG. 3 shows separately and in section a nozzle duct and jacket structure which forms part of the same nozzle portion;

FIG. 4 is a side elevation of the structure shown in FIG. 3; and

Figure 5:
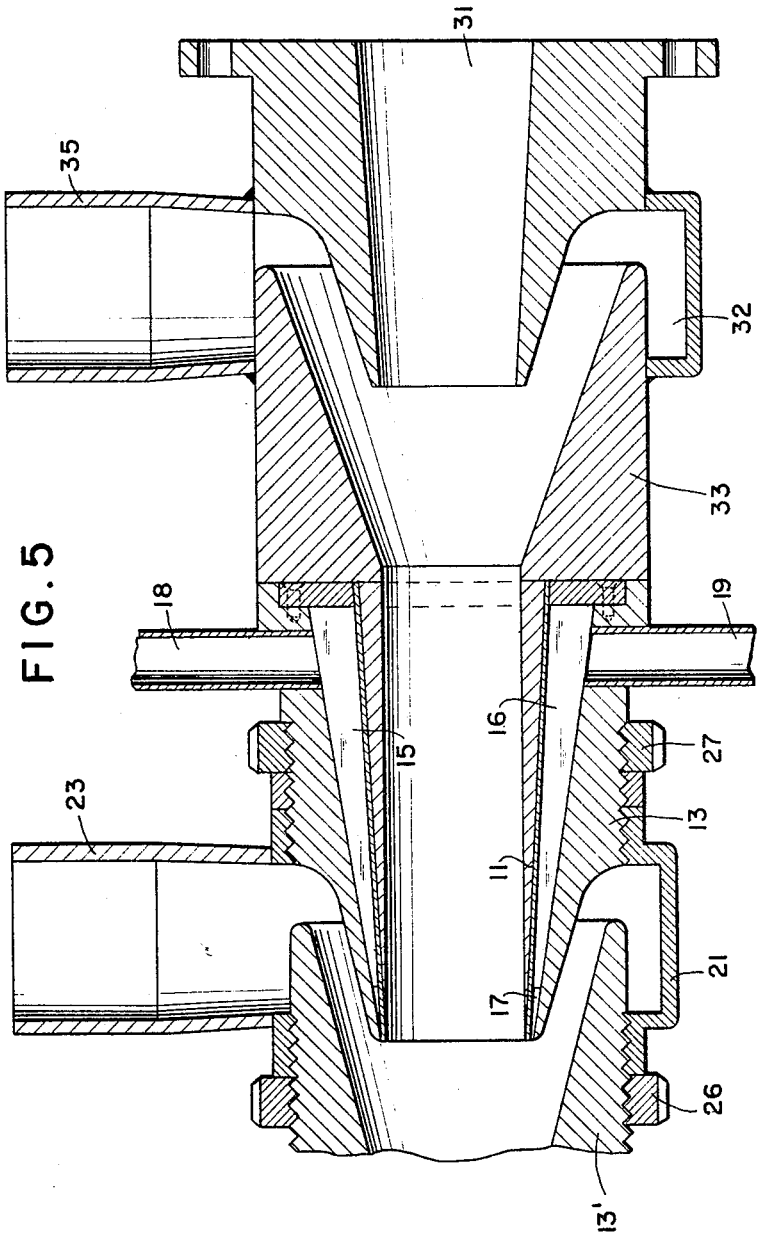
FIG. 5 shows a modified nozzle portion in apparatus otherwise as shown in FIGS. 1 and 2.

The illustrated embodiments relate to the pre-heating of pulverulent or granular synthetics such as polyvinyl chloride (PVC) to be subsequently subjected to a shaping or molding operation while still in hot condition.

As shown in FIG. 1, the granular material is supplied from a hopper or other container 1 to a nozzle device 2. The supply path may include a conventional cell-wheel or rotating rake devices for securing a continuous supply. A current of air is supplied by means of a pump 3 and is heated as it passes through a heating device 4. Temperature and speed of the air current are controllable. The speed control is effected, for example, by means of the pump drive motor 5 which is energized through a speed control rheostat 6. In the nozzle device 2, the hot air current has the effect of inducting the material from a nozzle outlet and passing it into a tubular channel structure formed by an elongated duct 7 in which the particles are carried by the hot air and continuously enveloped thereby. The channel is so long that when the air-borne material reaches its end, the material has reached the desired fabricating temperature without losing its particulate and still pourable constitution. In the illustrated embodiment a separator 8 is provided which discharges the heated granular material through its bottom outlet and permits the air to escape through its top outlet. The bottom outlet may be connected directly to a molding press or other fabricating device.

As will more fully appear from the embodiments described below with reference to FIGS. 2 to 4, the nozzle device 2 is preferably so designed that the air current passes laterally or concentrically about the outlet portion of the nozzle, while the particle material passes through the nozzle bore and the nozzle outlet without changing its travel direction, into the tubular channel. However, the arrangement may also be reversed so that the air current passes centrally through the nozzle bore whereas the material is guided laterally or concentrically about the nozzle in the direction toward the nozzle outlet opening. The heating or cooling of the material, depending upon the particular heat-treating purpose pursued, is effected by varying the pressure and temperature of the air current and/or the length of the tubular channel.

According to the preferred embodiment of the nozzle device separately shown in FIGS. 2 to 4, an elongated nozzle duct 11 receives the particle material at its right-hand end. The nozzle duct 11 tapers slightly toward its outlet opening located at the left end (FIG. 2).

The nozzle duct 11 is fastened to a flange 12 and inserted into a nozzle structure 13 whose likewise tapering opening has a larger diameter than the nozzle duct so that a jacket space 14 is formed between the duct 11 and the body 13. This space is subdivided by two diametrically opposite partitions 15 and 16 (FIGS. 3, 4) which extend over most of the duct length but stay short of the nozzle outlet thus leaving at 17 an annular space through which the two chambers of the jacket space communicate with each other. An inlet pipe 18 communicates with one of the jacket chambers and an outlet pipe 19 with the opposite chamber. During operation a temperature-controlling fluid, for example cooling water, is supplied through pipe 18 into the jacket and drains from tube 19 thus keeping the nozzle duct sufficiently cool to prevent premature agglomeration or sticking of the particle material as it passes through the nozzle.

The nozzle body 13, together with an annular housing 21, forms a ring-shaped passage 22 around the outlet portion of the nozzle (FIG. 2). The annular passage 22 communicates with a conduit 23 which supplies hot air from the above-mentioned heater and pump (FIG. 1). The ring-shaped passage 22 communicates with the air conduit 23 at a locality 24 rearwardly spaced from the nozzle outlet. Consequently, the hot air supplied through conduit 23 passes not only peripherally around the outlet portion of the nozzle, including part of its jacket, but is also forced to change its directions so that the rotating air current advances in the issuing direction past the nozzle opening and into an outlet tube 25 which is coaxially aligned with the nozzle and removably attached to the nozzle body 13. The interior of the tube 25 thus communicates directly with the nozzle duct 11 as well as with the surrounding annular air passage 22.

The housing 21 consists of two peripherally subdivided parts which are removably secured to the nozzle body 13 by respective nut members 26 and 27 in threaded engagement with an external screw thread of the cylindrical body 13. It has been found preferable to locally reduce the pressure of the air current at approximately the locality of the nozzle outlet. This is done by widening the tubular opening near the nozzle outlet. At a shortly subsequent point with respect to the travel direction, the pressure is preferably increased by again narrowing the tubular channel. These features are embodied in the left-hand portion 13' of the nozzle body shown in FIG. 2.

The embodiment shown in FIG. 5 differs from that described above with reference to FIGS. 2 to 4 by the provision of a second nozzle device. To the extent the modified embodiment corresponds to that of FIG. 2, reference may be had to the foregoing description. In addition, the device comprises another nozzle body 33 which forms a tubular nozzle duct 31 in coaxial alignment with the nozzle duct 11. Duct 31 tapers slightly in the material-issuing direction. The material is supplied through the right-hand inlet of the nozzle duct 31. An annular air passage 32 surrounds the outlet end of the nozzle duct 31 in the same manner as described above with respect to the annular passage 22, and communicates with an air supply conduit 35. This conduit communicates with the annular passage 32 at a locality rearwardly spaced from the outlet opening of nozzle duct 31 so that the air passes around the nozzle and is forced to change its direction toward the nozzle duct 11 in order to impose a forceful injector action upon the material entering into the nozzle duct 31.

When using the twin device for the heat treatment of synthetic plastics, cold air is supplied through the conduit 35 for entraining particle material into the jacketed nozzle 11; and the hot processing air proper is supplied through the conduit 23.

The method according to the invention has been performed for heating pulverulent and granular softener-free polyvinyl chloride (PVC). Employed was equipment of the type shown in FIG. 2.

Pulverulent PVC was supplied from a container in which it had a temperature of 15° C. By means of a nozzle device as described, the material was entrained into a tubular conduit of 4 meter length with the aid of an air current of 2 to 3 atmospheres pressure (above atmospheric) heated to about 140° C. After two to three seconds upon leaving the tubular channel, the pulverulent PVC had a temperature of 80 to 85° C. In the tubular conduit, as well as after leaving the conduit, the pulverulent PVC remained pourable; that is, the particles remained segregated by virtue of their air envelopment. This effect was observed despite the fact that the softening point of softener-free PVC is at about 70° C. At such temperatures, the material normally has the tendency to stick or bake together.

Under the same conditions, granulated and softener-free PVC of about 3 mm. grain size was heat treated in the same channel conduit. In this case a temperature of only 40 to 45° C. was reached. This can be explained by the fact that the relatively large granules of PVC require longer dwell times for assuming a temperature of 80 to 85° C. In order to reach the latter temperature for coarsely granulated PVC, it is preferable to extend the length of the tubular channel, to approximately 8 to 12 meters, without changing the temperature of the air current. The same result can be obtained without extending the tubular channel by increasing the temperature of the air current, or by a suitable combination of channel length and temperature.

To those skilled in the art, it will be obvious upon a study of this disclosure that my invention permits of various modifications and can be given embodiments other than particularly illustrated and described herein, without departing from the essential features of my invention and within the scope of the claims annexed hereto.

I claim:

1. Apparatus for heat treating particle materials, comprising material supply means, air supply means for providing an air current at the heat treating temperature, a nozzle device having an axially elongated nozzle duct forming a nozzle outlet at one end and having an enclosed jacket space surrounding said duct, duct means for passing fluid through said jacket space to control the nozzle temperature, said nozzle device having an annular air passage surrounding the nozzle outlet and part of the adjacent nozzle duct and jacket space, one of said two supply means being connected to said nozzle duct, said other supply means being connected to said annular passage at a location axially spaced from said nozzle outlet, an elongated tubular channel structure extending away from the nozzle outlet and communicating with said outlet and with said annular passage around the outlet, whereby heat-treating air entrains and envelops material and carries it through said channel structure for converting the travelling air-segregated material to the desired temperature.

2. Apparatus for heat treating particle materials, comprising a container for the material, a nozzle device communicating with said container for issuing material therefrom, said nozzle device having an axially elongated nozzle duct forming the nozzle outlet at one end and having an enclosed jacket space surrounding said duct and fluid supply means communicating with said jacket space for passing fluid therethrough to control the nozzle temperature, air supply means for providing air under pressure at the heat treating temperature, said nozzle device having an annular air passage surrounding the nozzle outlet and part of the adjacent nozzle duct and jacket space, said air supply means being connected with said annular passage at a location axially spaced from the nozzle outlet, an elongated tubular channel structure extending away from the nozzle outlet and communicating with said outlet and said annular passage around the outlet, whereby heat-treating air from said passage entrains and envelops material from said nozzle outlet and carries it through said channel structure for converting the travelling air-segregated material to the desired temperature.

3. Apparatus for heat treating comminuted materials such as pulverulent and granular synthetics, comprising a container for the material, first nozzle device communicating with said container and having an outlet opening for issuing the material, first air supply means, said first nozzle device having an annular passage coaxially surrounding said outlet opening and communicating with said first air supply means at a locality axially spaced from said opening so that air from said first supply means entrains material from said first nozzle device, a second nozzle device having an axially elongated nozzle duct aligned with said nozzle member to receive air-entrained material from said nozzle member, said second nozzle device having an enclosed jacket space surrounding said duct and extending substantially up to the nozzle outlet of said device, fluid supply means communicating with said jacket space for passing fluid therethrough to control the nozzle temperature, second air supply means for providing air under pressure at the heat treating temperature, said second nozzle device having an annular air passage surrounding the nozzle outlet and part of the adjacent nozzle duct and jacket space, said second air supply means being connected with said latter passage at a location axially spaced from the nozzle outlet, an elongated tubular channel structure extending away from the nozzle outlet and communicating with said outlet and said annular passage around the outlet.

4. The method of heat treating comminuted synthetic materials such as pulverulent and granular plastics immediately prior to further fabrication, which comprises issuing the material from a container through a nozzle, supplying a heated air current of higher temperature than the softening temperature of said material, directing the hot current peripherally around and axially along the nozzle outlet in the material issuing direction toward and into a tubular channel whereby the material particles are entrained and enveloped by the air current, simultaneously cooling the nozzle portion contacted by the hot air current to prevent the particles from adhering to the nozzle and continuously maintaining the air-entrained material travelling in the channel until the material has reached the desired fabricating temperature in still air-segregated condition.

5. The method of cooling a comminuted liquid, viscous or granular material, which comprises issuing the material from a container through a nozzle, supplying an air current and directing the air current peripherally around and axially along the nozzle outlet in the material-issuing direction toward and into a tubular channel whereby the material particles are entrained and enveloped by the air current, cooling the air current for correspondingly cooling the air-entrained material in the channel, simultaneously heating the nozzle portion contacted by the cold air current, and continuously maintaining the air-entrained material travelling in the channel until the material has reached the desired low temperature.

6. The method according to claim 4, which comprises passing the material to said nozzle through a coaxial other nozzle, and forcing another air current of lower temperature than said hot current to pass around and along the outlet of the other nozzle in said direction.

References Cited by the Examiner

UNITED STATES PATENTS

| 1,073,462 | 9/1913 | Bones | 263—21 |
| 1,639,967 | 8/1927 | Reader | 35—57 |
| 1,751,624 | 3/1930 | Du Brul | 302—25 X |

FOREIGN PATENTS

V4369 V1/5d    7/1956    Germany.

FREDERICK L. MATTESON, JR., *Primary Examiner.*

JOHN J. CAMBY, *Examiner.*